Sept. 17, 1940. M. MALTZ 2,215,125
SURGICAL KNIFE
Original Filed May 4, 1936
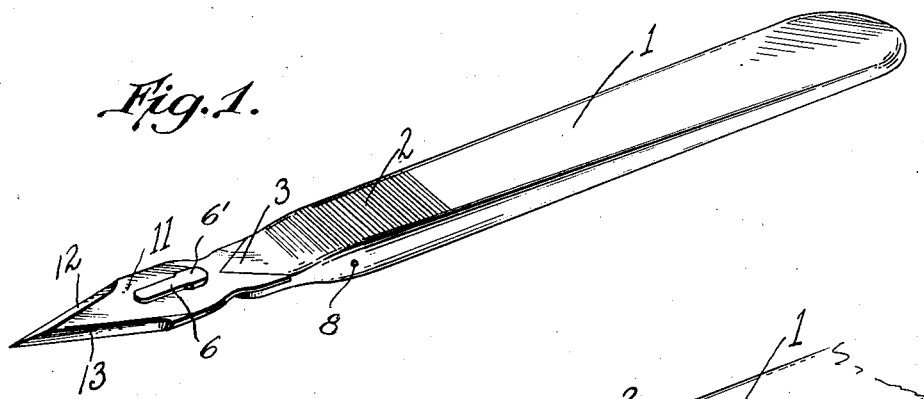
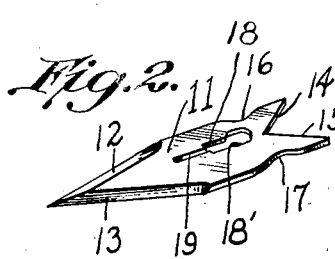
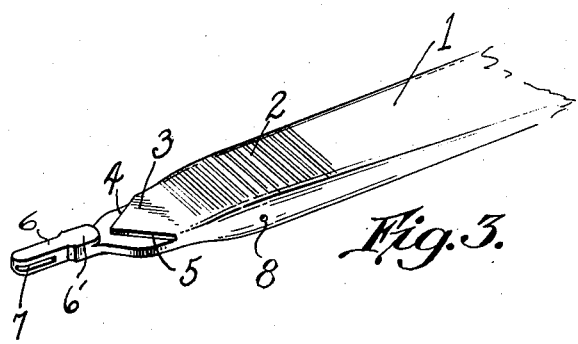
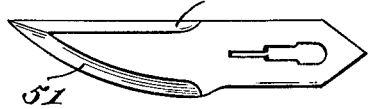
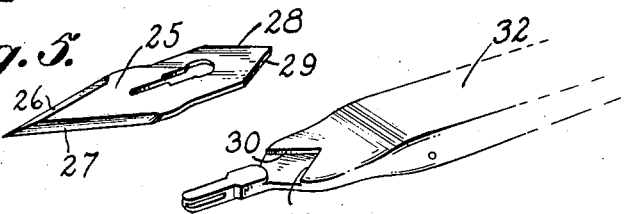
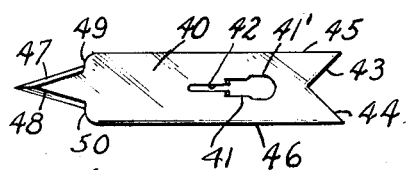
Inventor
Maxwell Maltz
By Fay Oberlin & Fay
Attorneys

Patented Sept. 17, 1940

2,215,125

UNITED STATES PATENT OFFICE 2,215,125

SURGICAL KNIFE

Maxwell Maltz, New York, N. Y.

Application May 4, 1936, Serial No. 77,851
Renewed February 7, 1940

2 Claims. (Cl. 30—339)

The present invention relating, as indicated, to a surgical knife, is more particularly directed to a knife of the removable blade type. Heretofore, it has been found advantageous to provide a handle member with connecting means so that a relatively large number of different, separate, blades can be engaged by such handle member. As far as I am aware, however, I am the first to provide a double edged removable blade, and in particular a means for anchoring the removable member so as to obtain a rigid structure that has the feel of an integral or one piece knife.

A more detailed object of the invention is to provide cooperating abutting surfaces upon a number of removable blades and a handle member, where such blades have double edges, and are securely locked regardless of the direction of the cutting action.

I have found that a double edged blade saves a great deal of time inasmuch as a knife with such a blade can be used to cut in two directions without the necessity of withdrawing the knife and rotating the same. This is especially advantageous in performing surgical operations where time is of the utmost importance.

Another object of the invention is the provision of means on the handle of a knife to orient the user as to which edge he is using while at work. This is particularly important to surgeons where the cutting action may take place in a location that is not visible.

To the accomplishment of the foregoing and related ends, said invention, then, consists of the means hereinafter fully described and particularly pointed out in the claims; the annexed drawing and the following description setting forth in detail several devices exemplifying my invention, such disclosed devices constituting, however, but a few of various applications of the principle of my invention.

In said annexed drawing:

Fig. 1 is a perspective view of the knife.

Fig. 2 is a perspective view of one form of removable blade.

Fig. 3 is a perspective view of the handle member.

Fig. 4 is a side elevation of Fig. 1.

Fig. 5 is a perspective view of a modification of the blade shown in Fig. 2.

Fig. 6 is a perspective view of a modified form of the handle member shown in Fig. 3; and Figs. 7 and 8 are plan views taken from above of still further modified forms of the blade shown in Figs. 2 and 5 respectively.

Referring now to the drawing, it will be noted that a handle member 1 is illustrated as having plateaus 2 in order to provide a better gripping surface, and these plateaus are preferably employed in both the lower and upper surfaces of the handle.

The particular form of the handle and especially its rearmost portion is of no particular significance and may be altered to suit the needs of the work contemplated. The forward portion of the handle member 1 is provided with an upstanding projection 3 having converging walls 4 and 5 which are designed to abut complementary walls upon a removable blade. The forward portion of the handle member 1 is also provided with an extension 6 having grooves 7 therein, and a shouldered portion 6' between the outermost part 6 and the handle proper. Thus the extension is divided into two parts 6 and 6' and the smaller portion 6 has the groove 7 therein. This is a modified and distinctly improved joint over that shown in the expired patent to Parker No. 1,284,411, since my extension fits more snugly and more firmly into slots 19, 18 and 18'.

The handle 1 is provided with means to orient the doctor as to which edge of the blade he is using while at work, such means, as indicated in Fig. 3, preferably being in the form of a small round projection 8. This renders it very simple for the surgeon to identify which blade he is using.

The preferred form of removable blade is shown in Fig. 2 where the forward portion of such blade is provided with converging cutting edges 12 and 13. The rearward portion of the blade 11 a V-groove constituted by the converging walls 14 and 15 is provided and these walls are designed to abut the walls 4 and 5 in the projection 3 of the handle member 1. The blade 11 is also provided with an aperture 18' which is reduced to form a smaller slot 19 that is designed to engage the grooves 7 in the extension 6 of the handle member 1. Intermediate of the slots 18' and 19 another slot 18 is formed so that the entire slot comprises a rearwardly disposed large slot portion 18', a smaller slot 18 and a still smaller slot 19. The slot 19 snugly fits the groove 7 and the slot 18 snugly fits the side walls of portion 6 of the extension, but slot 18' is slightly larger along its side walls only than the portion 6' to permit removal of the blade. The result of this construction is that the blade is held firmly to the handle and at the same time may be easily removed.

The blade 11 may also be provided with indentations 16 and 17 in order to render removal of the blade from the knife less difficult. In order to attach the blade 11 to the handle member 1 it is merely necessary to project the extension 6 through the opening 18' in such manner that the side walls of the slot 19 engage the grooves 7 and after the blade is forced backwardly the rearmost portion will flex into place in such way that the walls 4 and 5 firmly abut the walls 14 and 15 and the resulting knife has all the qualities of an integral structure.

In Fig. 5 the blade 25 is provided with converging cutting edges 26 and 27 and converging rear walls 28 and 29, these walls having a configuration complementary to the walls 30 and 31 in the handle member 32. The blade 25 is engaged in the same manner as set forth with respect to the blade 11.

In Fig. 7 a modified form of blade 40 is shown, this blade having an aperture 41', and a smaller aperture 41, the last named aperture having a slot 42 of reduced dimensions at its forward portion. At its rear portion the blade is provided with a V-groove formed by the converging walls 43 and 44, these walls being adapted to abut complementary walls upon a handle member. The forward portion of the blade 40 is provided with cutting edges 47 and 48 of less extent than the cutting edges of the blades 11 and 25. The cutting edge 47 is connected to the longitudinal edge 45 by the shoulder 49 and a similar shoulder 50 connects edge 48 and edge 46. This blade 40 is adapted to be installed and removed in exactly the same manner as blades 11 and 25 and it will not, therefore, be necessary to describe this operation.

Fig. 8 embodies a further modification, particularly of the cutting edges, it being understood that the anchoring means may consist of those shown or may comprise a joint as shown in Figs. 1 and 2. The cutting edge 52 extends in a substantially straight line in Fig. 8 and the edge 51 is curved so as to offer two edges of different contour on a single blade.

It will now be seen that I have provided a knife that comprises a handle member and a removable blade. This is quite advantageous in that great expense can be saved by using the same handle member with a large number of blades which requires an investment in the blades only instead of an investment in a large number of integral knives. It will also be seen that I have provided a double edged removable blade which adds to the economy of the instrument, and that such blade is very firmly anchored in place on the handle so as to have all of the advantages of an integral structure. In addition, it will be noted that means are provided to orient the surgeon as to which edge he is using. Finally, altho the blade is very easily removed and installed, once in place the knife is just as efficient as a one piece knife.

Other modes of applying the principle of my invention may be employed instead of the one explained, change being made as regards the device herein disclosed, provided the means stated by any of the following claims or the equivalent of such stated means be employed.

I therefore particularly point out and distinctly claim as my invention:

1. A knife comprising a handle and a removable blade, said handle having an upstanding projection thereon, said projection and one end of said blade having complementary V-shaped surfaces adapted to abut each other when said blade is engaged by said handle, and said blade having two diverging cutting edges, said blade being slotted for the reception of a blade support, said support extending outwardly from the end of said handle, one of said edges being straight and the other being curved.

2. A knife comprising a handle and a removable blade, said handle having an upstanding projection thereon, said projection and one end of said blade having complementary V-shaped surfaces adapted to abut each other when said blade is engaged by said handle, and said blade having two diverging cutting edges, said blade being slotted for the reception of a blade support, said support extending outwardly from the end of said handle, said diverging cutting edges extending in straight lines.

MAXWELL MALTZ.